United States Patent [19]
Barber

[11] Patent Number: 5,245,537
[45] Date of Patent: Sep. 14, 1993

[54] GOLF DISTANCE TRACKING, CLUB SELECTION, AND PLAYER PERFORMANCE STATISTICS APPARATUS AND METHOD

[76] Inventor: Andrew T. Barber, 3701 Misty Creek Dr., Austin, Tex. 78735

[21] Appl. No.: 797,705

[22] Filed: Nov. 25, 1991

[51] Int. Cl.$^5$ .................... G06F 15/44; G06G 7/78
[52] U.S. Cl. .................... 364/410; 364/453
[58] Field of Search ............ 340/988, 989, 990, 991; 364/410, 411, 449, 450, 451, 452, 453, 561, 566

[56] References Cited

U.S. PATENT DOCUMENTS

| | | | |
|---|---|---|---|
| 4,321,678 | 3/1982 | Krogmann | 364/453 |
| 4,698,781 | 10/1987 | Cockerell, Jr. | 364/561 |
| 4,815,020 | 3/1989 | Cormier | 364/709.11 |
| 4,879,658 | 11/1989 | Takashima et al. | 364/449 |
| 4,910,677 | 3/1990 | Remedio et al. | 364/410 |
| 4,922,444 | 5/1990 | Baba | 364/566 |

Primary Examiner—Roy N. Envall, Jr.
Assistant Examiner—Stephen R. Tkacs
Attorney, Agent, or Firm—Shaffer & Culbertson

[57] ABSTRACT

A golf distance tracking, club selection, and player performance statistics device having a portable movement measurer, a microprocessor connected to the movement measurer, a memory connected to the microprocessor, and an input keypad and a display output also interconnected. A data base is provided on a nonportable computer system that contains reference coordinates for each hole on the golf course and every significant hazard. Further, the data base contains past performance player information for each member player. The individual player selects a portable distance tracking device and receives downloaded, updated, current topographical data from the base data base of the course he is to play, including his own personal past performance record. After initializing the portable distance tracking device at the number one tee, the movement measurer, accelerometers in particular, keep track of the player's position throughout the play of the ball. As a result, at every position on the golf course the player is provided with an ability to determine the exact distance from the ball to any identifiable hazard and/or the hole in question. As information is inputted to the portable device, a record of clubs used and distance obtained is generated so that proper club selection for the distance involved becomes a matter of mechanical recommendation of the device.

5 Claims, 8 Drawing Sheets

FIG. 9

BARTON CREEK

Player Name: Andrew Barber
Member ID: 006543
Date: 8 Aug 1991

Hole Number: 1
Distance: 354    Measured: 341
Par: 4
Handicap: 17

| Shot # | Club Used | Distance Hit |
|---|---|---|
| 1 | 1 W | 260 |
| 2 | P W | 82 |

Putts: 2
Score: 4
Penalties: 0

Hole Number: 2
Distance: 565    Measured: 496
Par: 5
Handicap: 7

| Shot # | Club Used | Distance Hit |
|---|---|---|
| 1 | 1 W | 252 |
| 2 | 5 W | 220 |
| 3 | P W | 85 |

Putts: 2
Score: 5
Penalties: 0

Scorer:                                Attest:

BARTON CREEK

---

Player Name:     Andrew Barber
Member ID:       006543
Date:            8 Aug 1991

Total Distance:  6956
Total Par:       72.2
Total Putts:     25          Average Putts:     1.38
Total Penalties: 2

Total Fairways in Regulation:     12 / 18
Total Greens in Regulation:       14 / 18

Total Score:     84
Handicap:        12
Net Score:       69

---

Scorer:                         Attest:

---

GOLF DISTANCE TRACKING, CLUB SELECTION, AND PLAYER PERFORMANCE STATISTICS APPARATUS AND METHOD

BACKGROUND OF THE INVENTION

This invention relates to a golf distance tracking, club selection, and player performance statistics device.

In the sport of golf, skillful playing is enhanced by the ability to judge the distance to the flag pole, as well as to sand traps, water, or other hazards, from the current position of the ball as one approaches the green. Knowing this distance enables the player to choose the appropriate club. Frequently, because the golfer has only an inaccurate knowledge of the distance and is uninformed about his own past performance in a similar circumstance, the golfer will over-club or under-club the shot.

Often, golfers on the fairway end up applying "body english" during the stroke in a deliberate effort to modify the distance traveled by the ball. This is called "pressing" and is generally motivated by the desire to apply experience learned in other sports to the problem of fairway ranging in golf, and it usually produces detrimental results. In contrast with other sports, proper club selection rather than the amount of force applied plays an important role in proper ranging on the golf course. In other words, a properly taught golfer swings consistently and uniformly, varying the distance by proper club selection only.

Both manual and automatic devices for assisting a player's performance on a golf course have been known for quite some time. These generally include rangefinder type devices which are capable of measuring, with varying degrees of accuracy, the distance to a given object, such as a flag pole. Examples of such devices are disclosed in Kitay U.S. Pat. No. D247,452; Hudak U.S. Pat. No. 3,907,288; and, Brucker U.S. Pat. No. 3,824,698. All of these devices require that the flag pole be visible to the golfer from the current position of the ball in order to be effective. That is, these devices are not effective if the flag pole is not visible.

Many other prior art devices require the flag pole to act as a target of or receiver for transmissions. That is, the flag pole is relied upon to return a signal pulse for prior art distance sensing devices that use sonar, laser, ultrasonic, or radio transmissions such as described in Czajkowski U.S. Pat. No. 4,464,738; Shipp, et al., U.S. Pat. No. D268,910; Lipschutz U.S. Pat. No. 4,574,378; and, Terry U.S. Pat. No. 4,910,717.

Still other prior art devices require the golfer to consult maps and to make "on the spot" distance calculations such as described in Tattershal U.S. Pat. No. 4,783,071 and May U.S. Pat. No. 4,419,655.

The prior art includes other expensive and complex devices such as devices that are installed on golf carts which provide target and hazard distance information updated every ten yards by using sensors installed below the fairway turf. Further, various pocket-sized electronic devices are available on the market which are capable of recording, manipulating, and displaying golfer performance information. Nonetheless, these devices do not provide any distance tracking capability.

A drawback to the golf distance tracking devices known in the art is that none of the prior art devices provide, in an integrated way, all of the following functions, namely: accurate, continuous tracking of the player's position on the fairway and, thus, of the player-to-pin or player-to-hazard distance; complete, long-term recording of individual player performance; and an optimal club selection based on up-to-date measured distance and performance data. Thus, there is a need in the art for providing a single device that performs these functions. It, therefore, is an object of this invention to provide a golf distance tracking device wherein the flag pole does not need to be visible, neither does the flag pole need to be equipped with special sensors or other instruments to enable the distance measuring device to operate, and the distance tracking device does not use any electromagnetic or acoustical energy source in order to measure distance from target objects, thus avoiding the need for costly certification of compliance with regulations concerning energy-emitting devices.

SHORT STATEMENT OF THE INVENTION

Accordingly, the golf distance tracking, club selection, and player performance statistics device of the present invention possesses the desired requisites of measuring distance, recording player performance, suggesting proper club selection based on distance and past performance, and being relatively compact and capable of being carried on the fairway attached to the golfer's belt or golf bag. The invention includes a portable movement measuring system connected to a microprocessor. The microprocessor is connected to a memory for the storage and retrieval of data. Further, an input keypad and an output display device are connected to the microprocessor. This portable device is used in conjunction with a base system data base located in the club house. The base system data base in the clubhouse is comprised of a microcomputer suitable for running software that enables the long-term storage of all of the member player's performance data as well as room for the storage and processing of the topographical data of each golf hole required by the portable device to compute a player's distance from each hole and hazard. Further, the golf club base system provides the input/output capabilities needed to transfer data between the base system and the portable device.

Once the topographical data and the individual player's data is downloaded to the portable tracking device, the golfer aligns the device with an orientation reference point on any suitable marked object. This establishes a reference coordinate system. For each golf hole, the portable device is provided with the cartesian coordinates, with respect to the reference coordinate system, of important points along the fairway, i.e. the hole, the hazards, etc.

A local coordinate system is then associated with the device in such a way that the local x-axis and y-axis coincide with the axes of the movement measuring device portion of the device. The movement measuring device includes an accelerometer for measuring linear movement. As the golfer moves along the fairway, the portable device continuously computes the coordinates of the golfer, with respect to the reference coordinate system, by integration of the linear acceleration values read from the linear accelerometer. Instantaneous displacements with respect to the local coordinate system are then converted to displacements with respect to the reference coordinate system to account for differences. At any time, therefore, the device can compute the distance of the golfer from any significant point on the golf course whose coordinates have been provided to the device and stored in its memory. Importantly, club selection, the major problem faced by amateur golfers, can be compared with past performance information, such as distance they hit with a three iron. This should markedly speed up play as the distance to known hazards and the hole become instantly known and club selection made easy.

BRIEF DESCRIPTION OF THE DRAWINGS

Other objects, features, and advantages of the present invention will become more fully apparent from the following detailed description of the preferred embodiment, the appended claims and the accompanying drawings in which:

FIG. 9 is a sample hole by hole report; and

FIG. 10 is a sample round summary.

DETAILED DESCRIPTION OF THE PREFERRED EMBODIMENT

Figure 1:
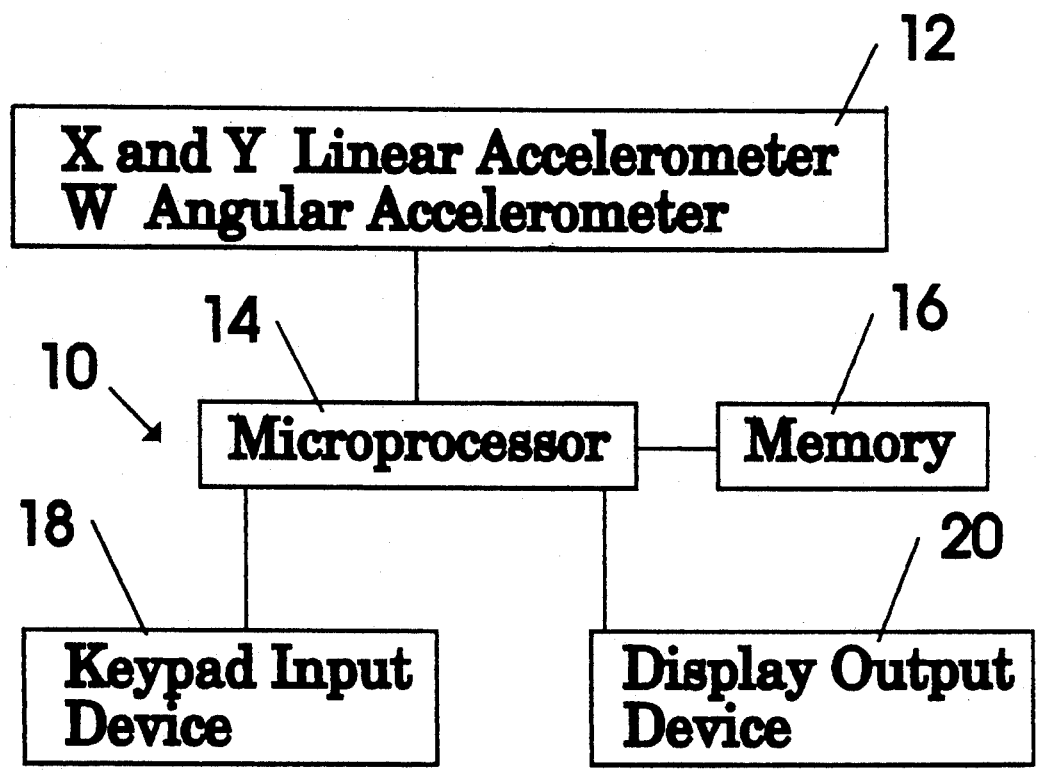
FIG. 1 is a block diagram illustrating the functional components of the portable tracking device.

The preferred embodiment of the present invention is illustrated by way of example in FIGS. 1–10. With specific reference to FIG. 1, a golf distance tracking, club selection, and player performance statistics device 10 is comprised of several functional elements. A movement measurer 12 is provided. In a preferred embodiment, the movement measurer consists of a biaxial linear accelerometer for measuring linear movements in two orthogonal directions and an angular accelerometer for measuring the angular rotation around a third direction orthogonal to said two orthogonal directions. The movement measurer 12 is connected to a microprocessor 14, known in the art, capable of performing logical and arithmetical operations. Memory 16 is provided in the form of a random access memory capable of storing golf course geometrical and topographical data and player performance data. A keypad 18 allows user input and a display device 20 is provided for presentation to the user of current position and distance measurements, including distance traveled from tee, distance to the green, distance to other hazards, etc., club selection, past performance, and other data.

Figure 2:
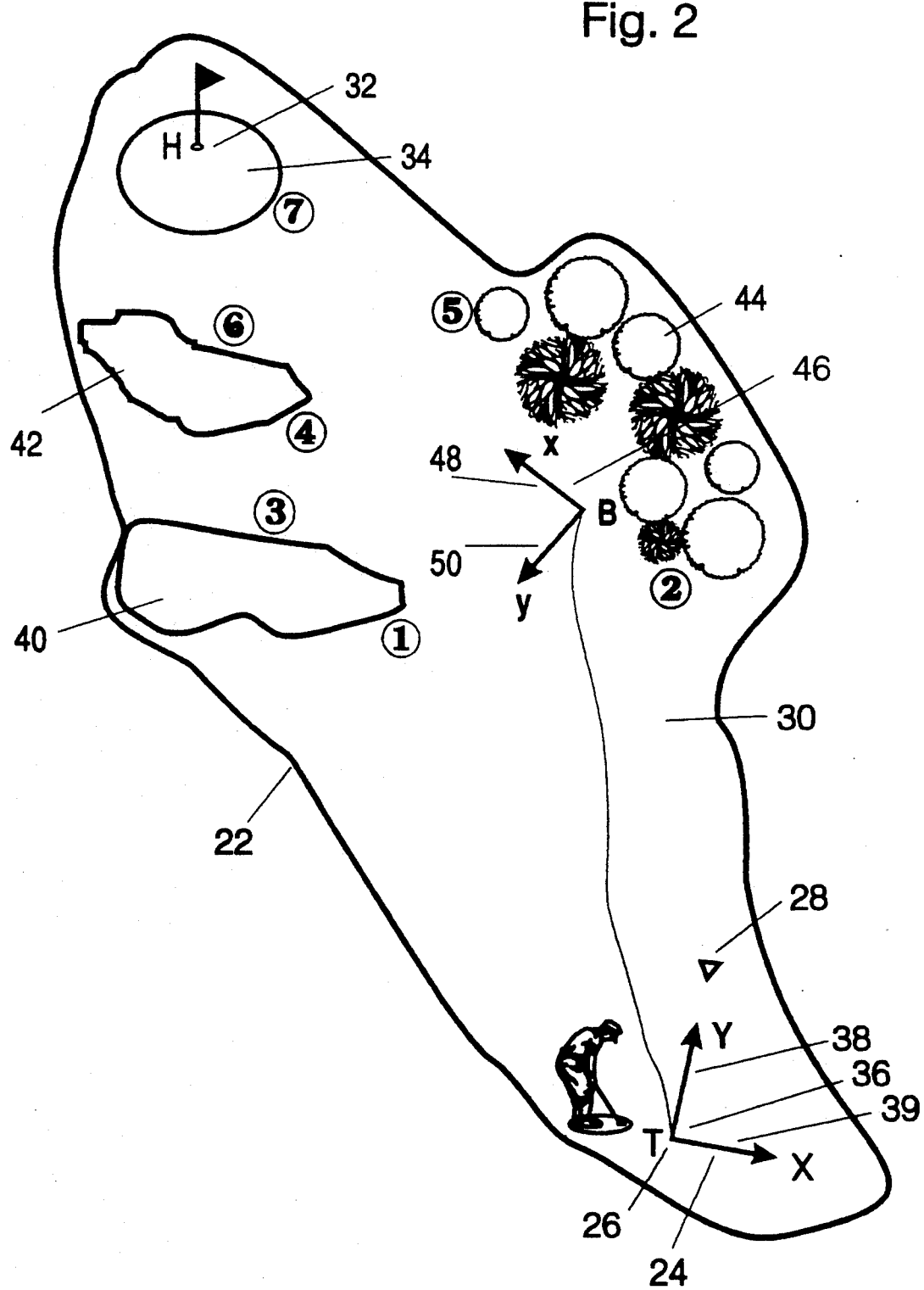
FIG. 2 is a schematic diagram illustrating the principle of operation of the invention with respect to the distance tracking function of the device.

The principle of operation of the invention with respect to the distance tracking function of movement measurer 12 can be better explained by referring to FIG. 2. For each golf hole 22, a reference cartesian coordinate system 24 is established by placing the device at tee 26 and pointing it in the direction of an orientation reference point 28 somewhere on the fairway 30. The orientation reference point 28 can be any visible object on the golf course, e.g. a tree, a rock, etc., on which a visible mark has been made. Importantly, the orientation reference point does not need to be the flag pin 32 at the green 34. The tee 26 becomes the origin (0,0) 36 of the reference coordinate system 24 and the imaginary line from the tee 26 to the orientation reference point 28 becomes the Y-axis 38 with associated reference X-axis 39.

For each golf hole 22, the invention is provided with the cartesian coordinates, with respect to the reference coordinate system 24, of important points on the fairway, e.g. the flag pole/hole 32, and any notable hazard such as water 40, sand 42, or trees 44.

A local coordinate system 46 is associated with the invention in such a way that the local X-axis 48 and local Y-axis 50 correspond with reference X-axis 39 and reference Y-axis 38. As the golfer moves on the fairway 30, the invention continuously computes the coordinates of the golfer with respect to the reference coordinate system 24 by integration of the linear acceleration values read from the two "on-board" linear accelerometers within the movement measurer 12.

Instantaneous displacements with respect to the local coordinate system 46 are then converted to displacements with respect to the reference coordinate system 24 to account for the rotation of the local X-axis 48 with respect to the reference X-axis 39. The rotation is continuously computed, as more fully discussed in FIG. 3, by the device by integrating the angular acceleration read from the on-board angular accelerometer.

At any time, therefore, the invention can compute the distance of the golfer from any significant topographical feature on the golf hole 22 whose coordinates have been provided to the device and stored in its memory 16. Referring to FIG. 2, for example, reference point 1 short of water hazard 40, reference point 2 short of trees 44, reference point 5 short of trees 44, reference point 3 just beyond water hazard 40, reference point 4 just before sand trap 42, reference point 6 just beyond sand trap 42, and reference point 7 at the front edge of green 34, in addition to the current hole placement for flag 32, can all be stored in the device for use as distance references during play of the hole.

Figure 3:
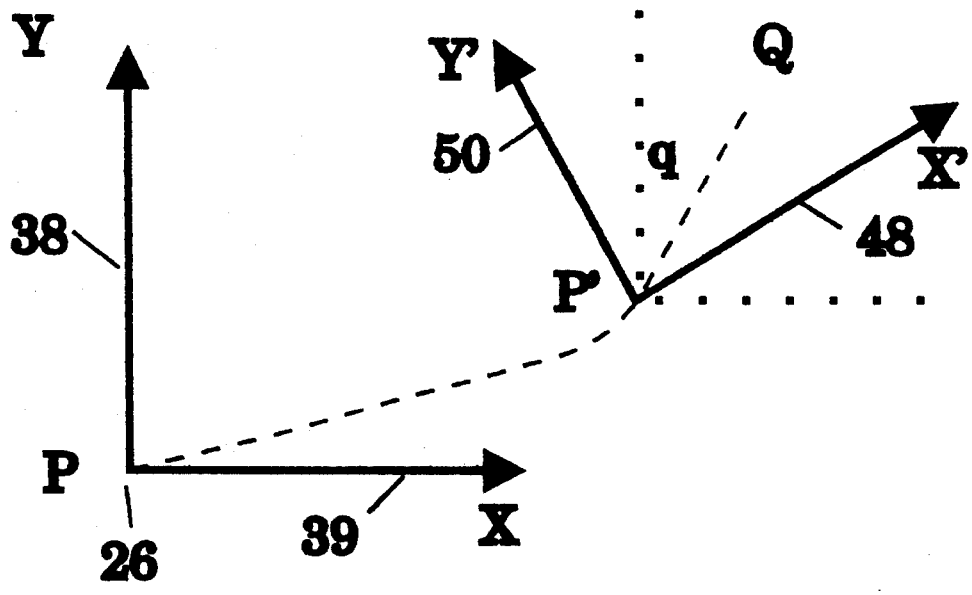
FIG. 3 is an illustration of a displacement computation of the invention.

Referring now to FIG. 3, the displacement computation of the invention will be illustrated. In FIG. 3 let:

(X, Y) be the reference coordinate system 24 when the player is at the tee 26;

(X', Y') be the local coordinate system 46 when the player is at a point P' on the fairway 30;

Q(x', y') be the new position of the player after a small movement from point P' to Q;

so that the vector q from P' to Q is given by:

$$q = dx'\, i' + dy'\, j' = dx\, i + dy\, j$$

where dx' and dy' are the displacements from P' measured by the accelerometers of movement measurer 12 with axis parallel to X' and Y' respectively, while dx and dy are the same displacements along the X and Y axes, 39 and 38 respectively, of the reference coordinate system 24. Using the relationships:

$$i' = i \cos\theta + j \sin\theta$$

$$j' = j \cos\theta - i \sin\theta$$

one obtains:

$$dx = dx' \cos\theta - dy' \sin\theta$$

$$dy = dx' \sin\theta - dy' \cos\theta$$

where $\theta$ is the angle between the X' axis 48 and the X axis 39 of the local and reference coordinate systems 24 and 46 respectively.

Figure 4:
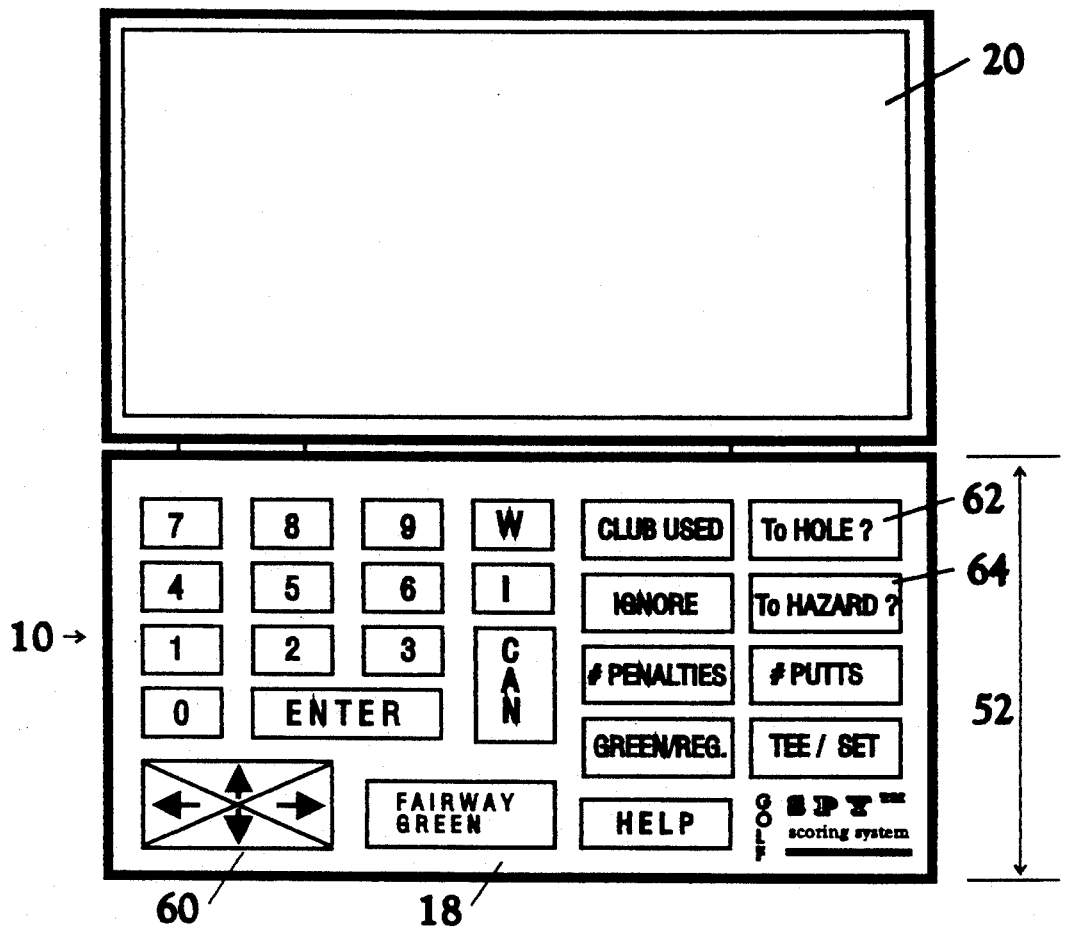
FIG. 4 is a top view of a preferred embodiment of the portable golf tracking device of the present invention.
Figure 5:
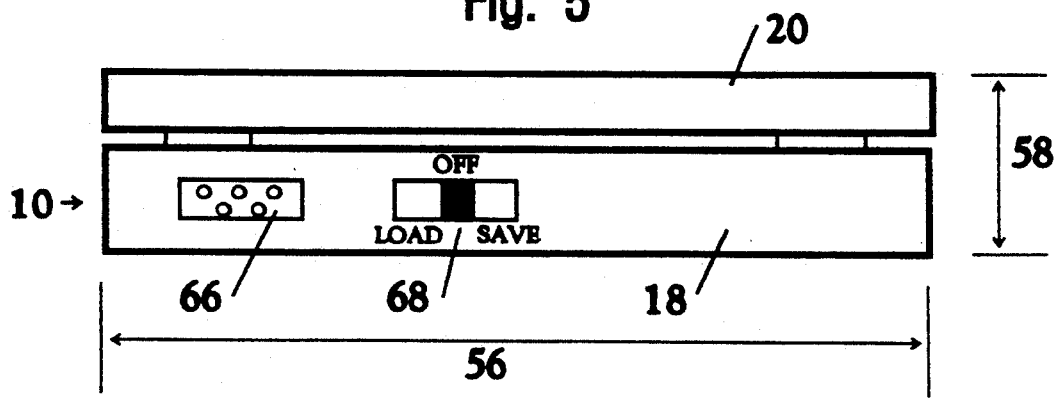
FIG. 5 is a rear side view.

Referring now to FIGS. 4 and 5, a representation of the portable golf distance tracking, club selection, and player performance statistics device 10 of the invention is illustrated. In a preferred embodiment, device 10 has measurements of approximately a width 52 of three inches, a length 56 of five inches, and a thickness 58 of one inch. In this embodiment, keypad is rotatably attached to display device 20 so that display device 20 can be folded up as is known in the art for lap top computers, checkbooks, calculators, etc. Keyboard 18 includes cursor director device 60 and other obvious data entry keys such as distance to the hole at any time 62, distance to hazard 64, etc. Cursor 60 provides distance information wherever it is positioned on the displayed fairway or green Referring now to FIG. 5, portable device 10 includes serial link 66 and on/off, load, save switch 68.

Figure 6:
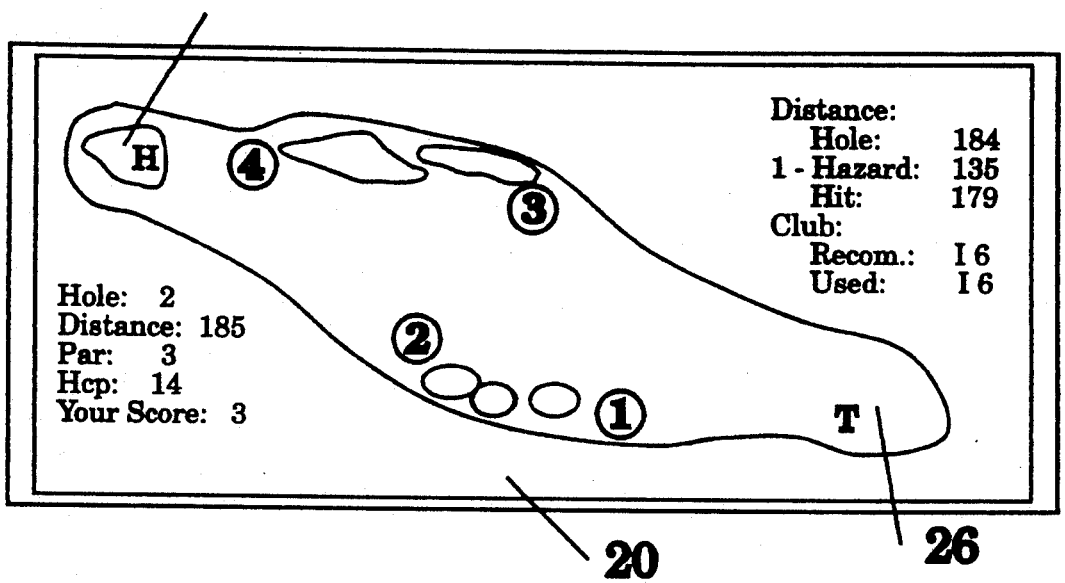
FIG. 6 is a screen display illustrating the display of the fairway with hazards as seen on the portable golf tracking device.

Referring now to FIG. 6, a fairway display is shown on display device 20 for golf hole 22. In this instance, the entire hole is laid out from tee 26 to flag pin/hole 32. The user initiates the use of the device by observing the information provided on display 20 including the hole number, in this case number two; the distance from the middle of tee box 26 to the middle of the green, 185 yards; par and hole handicap. Other important information is also provided. For example, the actual distance from the hole on the day played, 184 yards from the current tee location to the actual flag position; the distance to hazard number one, 135 yards; and, the distance that the player hit the ball from the tee, 179 yards. In this instance, the device also recommends a club based on the player's last performance at this distance, in this case a six iron, and the user enters the actual club used for future reference.

Figure 7:
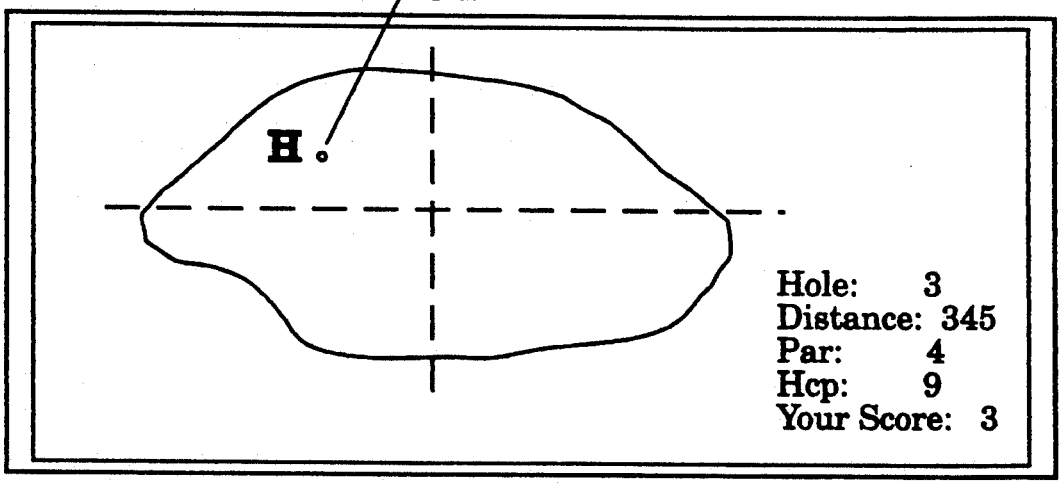
FIG. 7 is a screen display illustrating the display of the green, putting surface, as seen on the display screen.

FIG. 7 shows an enlarged view of green number three with the relevant general information provided for that particular hole as well.

Figure 8:
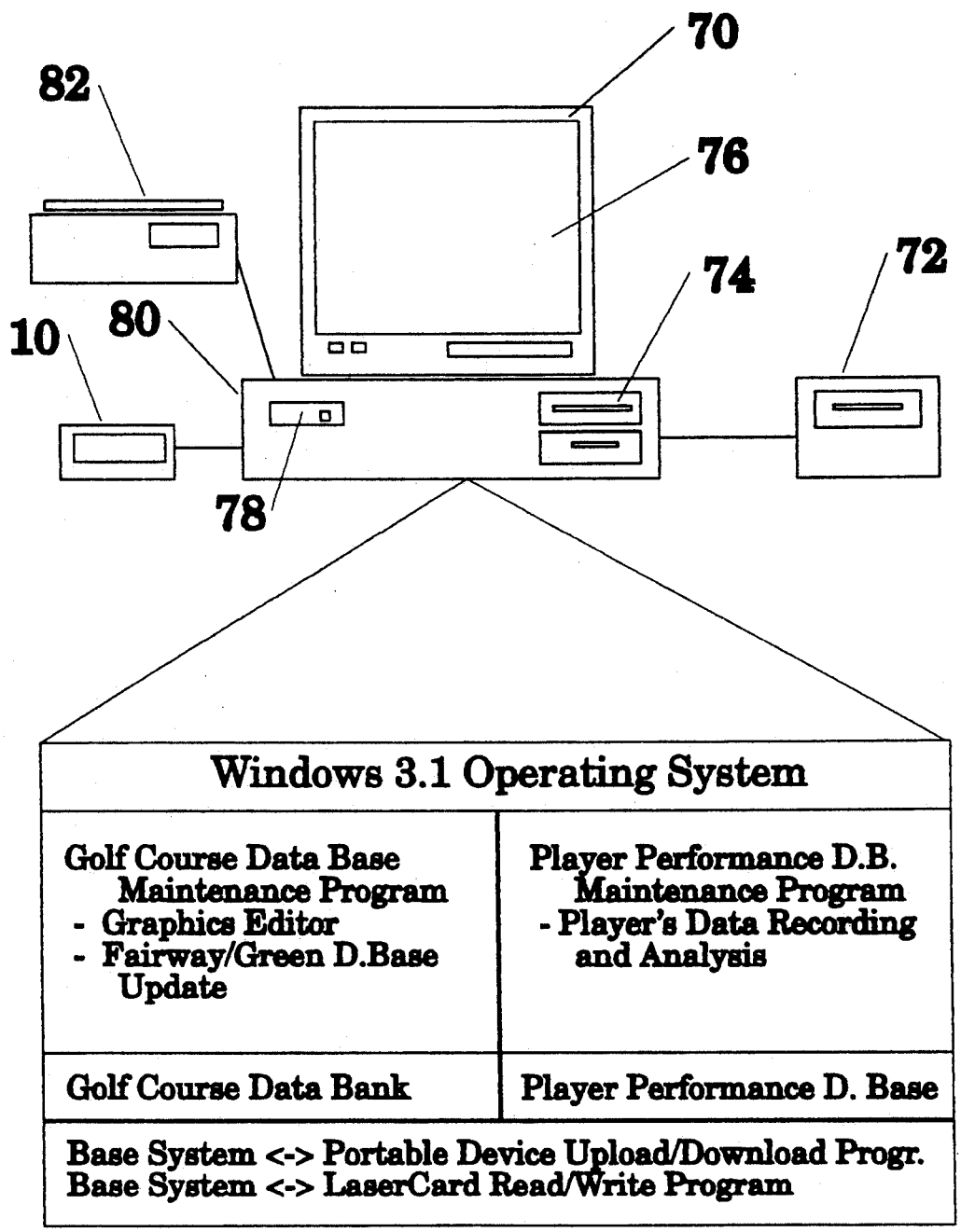
FIG. 8 is a diagram illustrating the golf club base system of the present invention.

Referring now to FIG. 8, the golf club base system 70 of the invention is illustrated. The base system 70 serves several purposes for the use of the portable device 10 of the invention. The base system 70 provides the long-term storage for every club member's performance data. This information is stored in the player performance data base. Further, the base system 70 provides the needed storage and processing capabilities for creating and maintaining each golf hole's topographical data required by the portable device 10 of the invention to compute the player's distance from the hole 32 and any hazards. This data is stored in the golf course data bank. Further, the golf club base system 70 provides the input/output capabilities needed to transfer data between the base system 70 to the portable device 10 through serial link 66 as well as between the base system 70 and a personal laser card device 72.

The golf club base system 70 consists of the following functional components: processing unit 74; display and input devices 76; internal storage devices, known in the art not shown, 78; communication device 80, including a serial port, not shown, for downloading/uploading to/from the portable device 10; and, hard copy device 82. Processing unit 74, in a preferred embodiment, is comprised of a twenty-five MHz 80386 based microcomputer with three MBytes dram memory. The microcomputer must be suitable for running windows 3.1 software, a data base management system, and graphics applications. The display and input devices 76 of a preferred embodiment of the invention include a VGA color monitor, keyboard, and mouse. The monitor and associated display controller have color graphics capabilities for displaying the topographical layout of a golf course. Internal storage devices 78 include a one hundred and ten Mbytes hard disc, three and one-half inch floppy drive, laser card reader/writer, and a laser card reader/writer drive. The hard disc stores the operating system, the application software, and the data base file. The laser card drive is capable of reading and/or updating player's data recorded upon the personal laser card. Hard copy device 82 is, in the preferred embodiment, comprised of a color printer.

The golf course data bank is used to store the following information for each hole of the golf course: 1) hole outline, which is used for display on the portable device 10 and for determining fairway boundaries; 2) green outline, used for display on the portable device 10; 3) hazards outline, used for display on the portable device 10; and, 4) coordinates of each hole and hazard, with respect to the reference coordinate system 24.

A player performance data base is also created and maintained on the golf club base system 70. This data base holds the following information at minimum, in the preferred embodiment, on each club member player: 1) player name; 2) player address; 3) membership ID; 4) fairway's hit (driving accuracy); 5) greens in regulation; 6) up and down (sand saves, two strokes or less); 7) penalty strokes; 8) par breakers (percentage per year); 9) number of eagles; 10) number of birdies; 11) scoring average; 12) handicap (current); and 13) club selection parameters.

During the operation of the device, the data base information relative to a player's performance is updated each time the performance data collected by the portable device 10 is uploaded to the base system 70 at the end of a round of play.

The club selection parameters, previously mentioned, are continuously updated based on the player's most recent performance, and are downloaded from the base system 70 to the player's portable device 10 to provide for, among other things, automatic club selection recommendations on the golf course.

Further, the player performance information can also be recorded on the personal laser card device card (not shown) so that this information can be used at other clubs using the club base system 70.

Suitable data base management software is provided with the base system 70 to support the following functions: data base updating; data query; reporting; and, data exchange with laser card personal card device 72 and portable device 10. As previously stated, the base system 70 communicates with portable device 10 via a serial link 66 in portable device 10 and serial port 80 in golf base system 70. Data can be exchanged in both directions.

In the preferred embodiment, the player's performance personal records are maintained on the club base system 70. However, in order to permit the use of the player's performance data on different golf courses, this data can be recorded on the player's personal card associated with personal laser card device 72. The personal card is the same size as a credit card. The data is recorded on the personal card by means of a process such as the one used for optical laser discs. The portable card is not erasable. Commercially available personal cards have a storage capacity of two million characters, equivalent to an eight hundred page book.

By utilization of the present invention, various reports can be generated from the information stored in the player performance data base of golf club base system 70. The main ones are the hole by hole report and the round summary. Referring now to FIG. 9, the hole by hole report contains the following data: club name; player name; membership ID; date; hole number; hole par number; tee to hole distance; for each stroke, club used, distance hit; total putts; total score; and penalty strokes. As shown in FIG. 10, the round summary report contains the following data: club name; player name; membership ID; date; total and average putts; total fairways in regulation; total green in regulation; total score; handicap; and, net score.

With regard to movement measurer 12, a wide variety of accelerometers are available for use in the invention. The following parameters must be considered when selecting an accelerometer for the invention: a) frequency range; b) minimum and maximum acceleration levels to be measured; c) sensitivity; d) temperature range; and, e) physical space and weight. The usable frequency range and acceleration range are inversely proportional to the sensitivity. The accelerometer maximum frequency should be at one hundred and twenty percent of the application's maximum frequency.

The minimum measurable acceleration is limited by the accelerometer/amplifier system's quiescent noise. The analog output of the lowest measured acceleration should be at least three times the system quiescent noise. The accelerometer's maximum acceleration should be at least one hundred and thirty percent of the maximum acceleration anticipated in the application. This protects against spikes and increases the useful life of the device.

Further, the thermal sensitive shift of the accelerometer should be less than plus or minus ten percent of the reading over the operating temperature range when the measure frequency is ten percent or less of the transducer's natural frequency. Finally, a miniature accelerometer with a compact, light-weight design and adhesive mounting should be used in the portable device 10 of the present invention.

In the operation, a player (not shown) checks out a portable device 10 from a golf club with a golf club base system 70. The golf club base system 70 downloads the most recent topographical data, in particular, pin placement, course coordinates, and personal performance statistics of the individual player to portable device 10. The player then proceeds to the number one tee 26 and orients the hand held device by pointing it in the direction of orientation reference point 28. Player then keys in the hole number, one, and gets a view of the entire hole on display device 20. Player then can determine the distance from tee 76 to any hazard identified on the screen. Once the distances have been accurately determined, the player can refer to portable device 10 for past performance and recommended club selection. A club is selected and that data is entered into the device and the portable device is then replaced on the golf bag or attached to the belt. After hitting the golf ball, player moves to the ball. At any point during his travel to his ball, he can utilize the system to determine distances to hazards since the updating of the local reference system to the reference coordinate system is continuous. Typically, however, the portable device 10 would be used next once the player had arrived to the position of his ball. At that point, portable device 10 is referenced and the display screen is chosen that is appropriate. If the player is still in the fairway, the view of the entire course is utilized to determine what hazard next lies ahead of the golfer and the distance thereto, or to the green, if that is appropriate. Any measurement desired can be obtained, however. Again, the device illustrates past performance and recommends club selection. A club is selected, the data is entered, and the ball is struck again. Assuming the player has reached the green, the device is next used to show the exploded view of the green only, for information of distance to the hole from the position of the ball on the green. The total number of strokes, including putts, utilized to finish the hole is entered and the player proceeds to the number two tee.

Upon completion of a round of golf, the player returns portable device 10 to the golf club. At the golf club, the information collected by the portable device 10 concerning the particulars of the round just played are uploaded to the golf club base system 70. That information then is assimilated with past performance stored on the base system 70 for a current evaluation of the player's performance. The player then has only to turn in portable device 10 for use on another day.

Should the player be going to another golf course utilizing the golf club base system 70 and wish to take his personal performance data with him, that can be done by means of the personal laser card device 72. A personal laser card is provided to player containing personal player performance data on the card. This card is then taken to another course which offers the golf club base system 70. The golf club base system 70 of that particular course transfers the information from personal card device 72 to the base system's data base. Then a portable device 10 is loaded with information of that particular course and the player proceeds to play a round of golf as previously described.

While the golf club statistics and selection device of the present invention has been disclosed in connection with golf courses only, it should be appreciated that the movement measuring advantages of the device can be used in any system where the coordinates of relevant objects have been predetermined. That is, the device could be easily used for private hunting preserves to determine distances to shelters, food caches, etc.

Further, while the present invention has been disclosed in connection with the preferred embodiment thereof, it should be understood that there may be other embodiments which fall within the spirit and scope of the invention as defined by the following claims.

I claim:

1. A portable distance tacking device for use by a player on a golf course, the apparatus comprising:
    (a) reference frame establishment means for facilitating the establishment of a reference coordinate system by the player;
    (b) navigation means for navigating within the reference coordinate system, the navigation means including linear accelerometers for detecting linear motion on at least two axes and at least one angular accelerometer for detecting angular displacement on at least one axis;
    (c) data transfer means for inputting data on the location of reference objects within the reference coordinate system;
    (d) data storage means for storing the input data;
    (e) computing means for performing computations including computing the location of the distance tracking device in the reference coordinate system and for computing the location of the reference objects relative to the distance tracking device; and (f) display output means for displaying data, the displayed data including the location of the distance tracking device in the reference coordinate system and the location of the reference objects relative to the distance tracking device.

2. The apparatus of claim 1 wherein:

(a) the data transfer means is also for inputting historical player performance data and for outputting player performance data acquired during use by the player;

(b) the computing means is also for aiding the player in golf club selection and for computing player performance data; and (c) the display means is also for displaying player performance data.

3. The apparatus of claim 1 further comprising a base computer system, the base computer system capable of transferring data to the distance tracking device and receiving data from the distance tracking device.

4. The apparatus of claim 3 further comprising a transportable data card means for facilitating the transfer of player performance data.

5. A portable distance tracking method for use by a player on a golf course, the method comprising the steps of:

(a) establishing a reference coordinate system;

(b) navigating within the reference coordinate system, the step including detecting linear motion on at least two axes and angular displacement on at least one axis;

(c) inputting data on the location of reference objects in the reference coordinate system;

(d) storing the input data;

(e) computing the location of the distance tracking device in the reference coordinate system;

(f) computing the location of the reference objects relative to the distance tracking device;

(g) displaying the location of the distance tracking device in the reference coordinate system; and (h) displaying the location of the reference objects relative to the distance tracking device.

* * * * *